(12) United States Patent
Freed et al.

(10) Patent No.: US 7,088,678 B1
(45) Date of Patent: Aug. 8, 2006

(54) SYSTEM AND METHOD FOR TRAFFIC SHAPING BASED ON GENERALIZED CONGESTION AND FLOW CONTROL

(75) Inventors: Michael Freed, Pleasanton, CA (US); Satish Amara, Mt. Prospect, IL (US); Michael Borella, Naperville, IL (US)

(73) Assignee: 3Com Corporation, Marlborough, MA (US)

( * ) Notice: Subject to any disclaimer, the term of this patent is extended or adjusted under 35 U.S.C. 154(b) by 968 days.

(21) Appl. No.: 09/941,280

(22) Filed: Aug. 27, 2001

(51) Int. Cl.
*H04L 12/26* (2006.01)

(52) U.S. Cl. .................................. 370/230; 370/236.1
(58) Field of Classification Search ..... 370/229–236.1, 370/248, 412; 709/232–235
See application file for complete search history.

(56) References Cited

U.S. PATENT DOCUMENTS

| | | | |
|---|---|---|---|
| 4,644,533 A | 2/1987 | Braff et al. ..................... 370/94 |
| 4,881,263 A | 11/1989 | Herbison et al. ............. 380/21 |
| 4,996,685 A | 2/1991 | Farese et al. ............... 370/58.1 |
| 5,014,234 A | 5/1991 | Edwards, Jr. ................ 364/900 |
| 5,138,712 A | 8/1992 | Corbin ........................ 395/700 |
| 5,301,273 A | 4/1994 | Konishi ....................... 395/200 |
| 5,347,304 A | 9/1994 | Moura et al. ................. 348/12 |
| 5,430,727 A | 7/1995 | Callon ..................... 370/85.13 |
| 5,442,749 A | 8/1995 | Northcutt et al. ...... 395/200.09 |
| 5,488,412 A | 1/1996 | Majeti et al. ................. 348/10 |
| 5,489,897 A | 2/1996 | Inoue .................... 340/870.39 |
| 5,528,595 A | 6/1996 | Walsh et al. ............. 370/85.13 |
| 5,583,931 A | 12/1996 | Schneider et al. .......... 379/399 |
| 5,586,121 A | 12/1996 | Moura et al. ................ 370/404 |
| 5,598,410 A | 1/1997 | Stone ......................... 370/469 |
| 5,600,717 A | 2/1997 | Schneider et al. .......... 379/399 |
| 5,606,606 A | 2/1997 | Schneider et al. .......... 379/399 |
| 5,608,446 A | 3/1997 | Carr et al. ...................... 348/6 |
| 5,610,910 A | 3/1997 | Focsaneanu et al. ........ 370/351 |
| 5,623,542 A | 4/1997 | Schneider et al. .......... 379/399 |
| 5,623,601 A | 4/1997 | Vu ......................... 395/187.01 |
| 5,636,211 A | 6/1997 | Newlin ....................... 370/465 |
| 5,675,732 A | 10/1997 | Majeti et al. .......... 395/200.01 |

(Continued)

FOREIGN PATENT DOCUMENTS

WO     WO 99/11003     3/1999

(Continued)

OTHER PUBLICATIONS

Droms, R., *Dynamic Host Configuration Protocol*, Request for Comments 1541, Oct. 1993, pp. 1 to 31.

(Continued)

*Primary Examiner*—Duc Ho
*Assistant Examiner*—Phuongchau Ba Nguyen
(74) *Attorney, Agent, or Firm*—McDonnell Boehnen Hulbert & Berghoff

(57) ABSTRACT

A system and methods are shown for traffic shaping and congestion avoidance in a computer network such as a data-over-cable network. A headend of the data-over-cable system includes a traffic shaper configured to calculate a packet arrival rate from a cable modem and a traffic conditioner configured to calculate an average queue size on an output interface to an external network. For example, the traffic shaper compares the packet arrival rate to three packet arrival thresholds including a committed rate threshold, a control rate threshold and a peak rate threshold. If the calculated packet arrival rate falls between the committed threshold and control rate threshold, the traffic shaper applies a link layer mechanism, such as a MAP bandwidth allocation mechanism, to lower the transmission rate from the cable modem.

35 Claims, 5 Drawing Sheets

U.S. PATENT DOCUMENTS

| | | | |
|---|---|---|---|
| 5,675,742 A | 10/1997 | Jain et al. | 395/200 |
| 5,678,041 A | 10/1997 | Baker et al. | 395/609 |
| 5,708,654 A | 1/1998 | Arndt et al. | 370/242 |
| 5,710,885 A | 1/1998 | Bondi | 395/200.54 |
| 5,724,510 A | 3/1998 | Arndt et al. | 395/200.5 |
| 5,761,602 A | 6/1998 | Wagner et al. | 455/3.1 |
| 5,778,181 A | 7/1998 | Hidary et al. | 395/200.48 |
| 5,784,597 A | 7/1998 | Chiu et al. | 395/552 |
| 5,790,198 A | 8/1998 | Roop et al. | 348/460 |
| 5,790,548 A | 8/1998 | Sistanizadeh et al. | 370/401 |
| 5,790,677 A | 8/1998 | Fox et al. | 380/24 |
| 5,790,770 A | 8/1998 | McClure et al. | 395/200.61 |
| 5,790,806 A | 8/1998 | Koperda | 395/200.82 |
| 5,793,747 A | 8/1998 | Kline | 370/230 |
| 5,799,086 A | 8/1998 | Sudia | 380/23 |
| 5,805,804 A | 9/1998 | Laursen et al. | 395/200.02 |
| 5,809,252 A | 9/1998 | Beighe et al. | 395/200.57 |
| 5,812,819 A | 9/1998 | Rodwin et al. | 395/500 |
| 5,815,664 A | 9/1998 | Asano | 395/200.57 |
| 5,818,845 A | 10/1998 | Moura et al. | 370/449 |
| 5,819,028 A | 10/1998 | Manghirmalani et al. | 395/185.1 |
| 5,819,042 A | 10/1998 | Hansen | 395/200.52 |
| 5,828,655 A | 10/1998 | Moura et al. | 370/236 |
| 5,828,666 A | 10/1998 | Focsaneanu et al. | 370/389 |
| 5,835,720 A | 11/1998 | Nelson et al. | 395/200.54 |
| 5,835,727 A | 11/1998 | Wong et al. | 395/200.68 |
| 5,841,777 A | 11/1998 | Cohen | 370/433 |
| 5,848,233 A | 12/1998 | Radia et al. | 395/187.01 |
| 5,852,721 A | 12/1998 | Dillon et al. | 395/200.47 |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 348/12 |
| 5,872,523 A | 2/1999 | Dellaverson et al. | 340/825.52 |
| 5,884,024 A | 3/1999 | Lim et al. | 395/187.01 |
| 5,892,754 A | 4/1999 | Kompella et al. | 370/236 |
| 5,894,479 A | 4/1999 | Mohammed | 370/401 |
| 5,903,558 A | 5/1999 | Jones et al. | 370/351 |
| 5,909,549 A | 6/1999 | Compliment et al. | 709/223 |
| 5,913,037 A | 6/1999 | Spofford et al. | 395/200.56 |
| 5,915,119 A | 6/1999 | Cone | 395/750.02 |
| 5,922,049 A | 7/1999 | Radia et al. | 709/220 |
| 5,922,051 A | 7/1999 | Sidey | 709/223 |
| 5,923,659 A | 7/1999 | Curry et al. | 370/401 |
| 5,926,458 A | 7/1999 | Yin | 370/230 |
| 5,929,850 A | 7/1999 | Broadwin et al. | 345/327 |
| 5,941,988 A | 8/1999 | Bhagwat et al. | 713/201 |
| 5,943,604 A | 8/1999 | Chen et al. | 455/5.1 |
| 5,954,797 A | 9/1999 | Sidey | 709/223 |
| 5,958,007 A | 9/1999 | Lee et al. | 709/219 |
| 5,960,177 A | 9/1999 | Tanno | 395/200.59 |
| 5,974,453 A | 10/1999 | Andersen et al. | 709/220 |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | 713/201 |
| 5,999,536 A | 12/1999 | Kawafuji et al. | 370/401 |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | 709/226 |
| 6,009,103 A | 12/1999 | Woundy | 370/401 |
| 6,012,088 A | 1/2000 | Li et al. | 709/219 |
| 6,013,107 A | 1/2000 | Blackshear et al. | 703/229 |
| 6,014,545 A | 1/2000 | Wu et al. | 455/3.1 |
| 6,018,767 A | 1/2000 | Fijolek et al. | 709/218 |
| 6,031,841 A | 2/2000 | Woundy | 370/410 |
| 6,032,019 A | 2/2000 | Chen et al. | 455/3.1 |
| 6,041,041 A | 3/2000 | Ramanathan et al. | 370/241 |
| 6,046,979 A | 4/2000 | Bauman | 370/229 |
| 6,046,983 A * | 4/2000 | Hasegawa et al. | 370/236.1 |
| 6,049,546 A | 4/2000 | Ramakrishnan | 370/412 |
| 6,049,825 A | 4/2000 | Yamamoto | 709/221 |
| 6,049,826 A | 4/2000 | Beser | 709/222 |
| 6,052,724 A | 4/2000 | Willie et al. | 709/223 |
| 6,058,421 A | 5/2000 | Fijolek et al. | 709/225 |
| 6,061,349 A | 5/2000 | Coile et al. | 370/389 |
| 6,064,372 A | 5/2000 | Kahkoska | 345/173 |
| 6,065,049 A | 5/2000 | Beser | 709/218 |
| 6,070,187 A | 5/2000 | Subramaniam et al. | 709/220 |
| 6,070,242 A | 5/2000 | Wong et al. | 713/201 |
| 6,070,246 A | 5/2000 | Beser | 713/201 |
| 6,073,178 A | 6/2000 | Wong et al. | 709/229 |
| 6,075,787 A | 6/2000 | Bobeck et al. | 370/395 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A | 8/2000 | Miller et al. | 710/19 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A | 11/2000 | Baskey et al. | 714/4 |
| 6,157,965 A | 12/2000 | Mohammed et al. | 710/8 |
| 6,170,061 B1 | 1/2001 | Beser | 713/201 |
| 6,178,455 B1 | 1/2001 | Schutte et al. | 709/228 |
| 6,185,624 B1 | 2/2001 | Fijolek et al. | 709/239 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,233,224 B1 * | 5/2001 | Yamashita et al. | 370/231 |
| 6,240,464 B1 | 5/2001 | Fijolek et al. | 709/250 |
| 6,243,369 B1 | 6/2001 | Grimwood et al. | 370/335 |
| 6,260,072 B1 | 7/2001 | Rodriguez-Moral | 709/241 |
| 6,269,099 B1 | 7/2001 | Borella et al. | 370/389 |
| 6,272,150 B1 | 8/2001 | Hrastar | 370/486 |
| 6,275,853 B1 | 8/2001 | Beser et al. | 709/223 |
| 6,289,377 B1 | 9/2001 | Lalwaney et al. | 709/222 |
| 6,295,554 B1 | 9/2001 | Karadogan | 709/219 |
| 6,301,223 B1 | 10/2001 | Hrastar et al. | 370/227 |
| 6,301,618 B1 | 10/2001 | Sitaraman et al. | 709/227 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,351,773 B1 | 2/2002 | Fijolek et al. | 709/228 |
| 6,370,147 B1 | 4/2002 | Beser | 370/401 |
| 6,393,478 B1 | 5/2002 | Bahlmann | 709/224 |
| 6,442,158 B1 | 8/2002 | Beser | 370/352 |
| 6,449,291 B1 | 9/2002 | Burns et al. | 370/516 |
| 6,453,472 B1 | 9/2002 | Leano et al. | 725/111 |
| 6,490,727 B1 | 12/2002 | Nazarathy et al. | 725/129 |
| 6,510,162 B1 | 1/2003 | Fijolek et al. | 370/432 |
| 6,625,118 B1 * | 9/2003 | Hadi Salim et al. | 370/236 |
| 6,865,185 B1 * | 3/2005 | Patel et al. | 370/412 |
| 6,868,063 B1 * | 3/2005 | De Cnodder | 370/236 |
| 6,904,015 B1 * | 6/2005 | Chen et al. | 370/235 |
| 6,914,883 B1 * | 7/2005 | Dharanikota | 370/230.1 |
| 2002/0122050 A1 | 9/2002 | Sandberg | 345/705 |
| 2002/0136165 A1 | 9/2002 | Ady et al. | 370/241 |
| 2002/0186660 A1 * | 12/2002 | Bahadiroglu | 370/248 |
| 2003/0028891 A1 | 2/2003 | Hardt et al. | 725/107 |
| 2003/0097461 A1 * | 5/2003 | Barham et al. | 709/235 |

FOREIGN PATENT DOCUMENTS

| | | |
|---|---|---|
| WO | WO 00/67385 | 11/2000 |

OTHER PUBLICATIONS

RFC 791, *Internet Protocol, DARPA Internet Program Protocol Specification*, Sep. 1981, pp. 1-37.

Postel, J., *Internet Protocol, DARPA Internet Program Protocol Specification*, RFC 792, Sep. 1981, pp. 1-14.

Postel, J., *User Datagram Protocol*, RFC 768, Aug. 28, 1980, pp. 1-3.

RFC 793, *Transmission Control Protocol, DARPA Internet Program Protocol Specification*, Sep. 1981, pp. 1-68.

Case, J. et al., *A Simple Network Management Protocol (SNMP)*, RFC 1157, May 1990, pp. 1-26.

Sollins, K., *The TFTP Protocol (Revision 2)*, RFC 1350, Jul. 1992, pp. 1-9.

Alexander, S., *DHCP Options and BOOTP Vendor Extensions*, RFC 2132, Mar. 1997, pp. 1-37.

"Radio Frequency Interface Specification (Interim Specification) SP-RFIv1.1-I03-991105", MCNS Holdings, L.P., 1999, pp. Ii to 366.

"Cable Modem to Customer Premise Equipment Interface Specification (Interim) SP-CMCI-I02-980317", Multimedia Cable Network Systems (MCNS) Holdings, L.P., Cable Television Laboratories, Inc., 1998, pp. ii to 40.

"Operations Support System Interface Specification Baseline Privacy Interface MIB (Interim Specification) SP-OSSI-BPI-I01-980331", MCNS Holdings, L.P., 1997 and 1998, pp. ii to 33.

"Cable Modem Termination System-Network Side Interface Specification (Interim Specification) SP-CMTS-NSII01-960702", MCNS Holdings, L.P., 1996, pp. ii to 13.

"Removable Security Module Interface Specification (Interim Specification) SP-RSMI-I01-980204", MCNS Holdings, L.P., Cable Television Laboratories, Inc., 1997, pp. ii to 47.

"Baseline Privacy Interface Specification (Interim) SP-BPI-[01-970922", MCNS Holdings, L.P., 1997, pp. ii to 65.

"Operations Support System Interface Specification (Interim) SP-OSSII01-970403", MCNS Holdings, L.P., 1997, pp. 1 to 30.

"Radio Frequency Interface Specification (Interim Specification) SP-RFI-I02-971008", MCNS Holdings, L.P., 1997, pp. ii to 186.

"Cable Modem Telephony Return Interface Specification (Interim) SP-CMTRI-I01-970804", MCNS Holdings, L.P., Cable Television Laboratories, Inc., 1997, pp. ii to 73.

"Security System Specification (Interim Sepcification) SP-SSI-I01-970506", MCNS Holdings, L.P., 1997, pp. ii to 103.

"Internet Engineering Task Force", Request for Comments 2131, Dynamic Host Configuration Protocol (DHCP), Mar. 1997, pp. 1 to 42.

S. Adiraju, J. Fijolek, IPCDN Telephony Return MIB, Internet Engineering Task Force, Internet Draft, "<draft-ietf-ipcdn-tri-mib-00.1.txt>," Mar. 1998, pp. 1 to 26.

Kyees, P.J. et a., *ADSL: A New Twisted-Pair Access to the Information Highway*, IEEE Communications Magazine, vol. 33, Issue 4, Apr. 1995, pp. 52-60.

Huang, Yin-Hwa et al., *Design of an MPEG-Based Set-Top Box for Video on Demand Services*, Acoustics, Speech, and Signal Processing, 1995, ICASSP-95., 1995 International Conference, vol. 4, ISBN: 0-7803-2431-5, May 9-12, 1995, pp. 2655-2658.

"A Solution for the Priority Queue Problem of Deadline-Ordered Service Disciplines," N.R. Figueira, IEEE International Conference on Computer Communications and Networks, Sep. 22-25, 1997, pp. 320-325.

"Radio Frequency Interface Specification (Interim Specification) SP-RFI-I04-980724", MCNS Holdings, L.P., 1997, pp. li to 196.

Ramakrishnan, K., *A Proposal to Add Explicit Congestion Notification (ECN) to IP*, RFC 2481, Jan. 1999, pp. 1 to 24.

ITU-T I.732, *Fucntional Characteristics of ATM Equipment*, Oct. 2000.

ITU-T I.363.3, *B-ISDN ATM Apaptation Layer Specification: Type 3/4 AAL*, Aug. 1996.

ITU-T I.326, *Functional Architecture of Transport Networks Based on ATM*, Nov. 1995.

"Radio Frequency Interface Specification (Interim Specification) SP-RFI-I05-991105", MCNS Holdings, L.P., 1999, pp. li to 202.

"Radio Frequency Interface Specification (Interim Specification) SP-RFIv1.1-I06-001215", MCNS Holdings, L.P., 2000, pp. ii to 432.

WAP Architecture, *Wireless Application Protocol Architecture Specification*, Version 12, Jul. 12, 2001, pp. 2-24.

www.cotse.com, *Congestion Avoidance Overview*, Oct. 30, 2000, pp. 1-8.

* cited by examiner

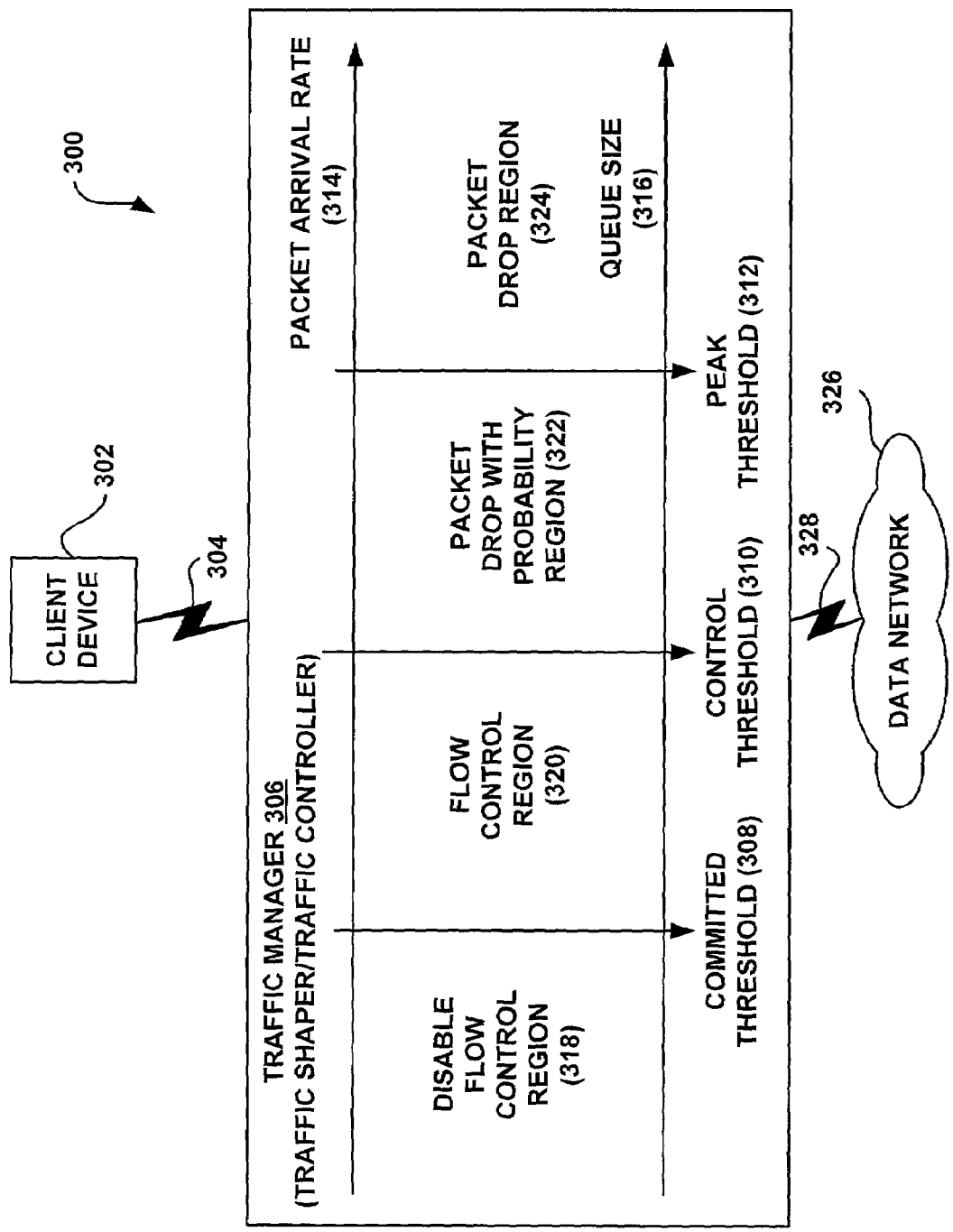

SYSTEM AND METHOD FOR TRAFFIC SHAPING BASED ON GENERALIZED CONGESTION AND FLOW CONTROL

FIELD OF THE INVENTION

The present invention relates to communications in computer networks. More specifically, it relates to a system and method for traffic shaping based on general congestion and flow control.

BACKGROUND OF THE INVENTION

In high-speed networks, routers are required to meet certain quality-of-service requirements associated with communicating network entities. As is known in the art, the quality-of-service is a communication network attribute that exists between two network entities requiring a predetermined network service level. The basic network parameters typically affecting network performance are bandwidth and delays since the application traffic between two network entities in a computer network may require a certain minimum bandwidth or may be sensitive to delays. Thus, in the simplest terms, the quality-of-service means providing consistent and predictable data delivery services to communicating network entities requiring a predetermined level of network service. Further, the quality-of-service is the ability of a network element, such as an application process, host or router to have some level of assurance that its traffic and service requirements can be satisfied.

In general, the quality-of-service elements manage network resources according to application demands and network management settings and, thus, cannot provide certainty that resource sharing occurs. Therefore, quality-of-service with a guaranteed service level requires resource allocation to individual data streams through the network. In current implementations, a priority for quality-of-service developers has been to ensure that resources allocated to the best-effort traffic are not limited after reservations are made. However, equally important is that the high-priority applications do not disable low-priority Internet applications.

The key mechanisms for providing a predetermined level of quality-of-service include an admission control, traffic shaping, packet classification, packet marking and packet scheduling. In quality-of-service enabled Internet Protocol ("IP") networks, it is necessary to specify a traffic profile for a connection or a set of connections. Traffic shaping or traffic conditioning is typically used, for example, to control the rate of data transmitted out of an interface so that it matches the speed of the remote target interface and, further, to ensure that the traffic conforms to a predetermined policy level. Thus, traffic shaping is primarily used to control the access to available bandwidth, to ensure that traffic conforms to a predetermined set of policies, and to regulate the flow of traffic in order to avoid congestion that can occur if the transmitted traffic exceeds the access speed of its remote, target interface.

Traffic shaping is typically implemented on an edge router or core router and provides a mechanism to control the amount and volume of data being sent into the network as well as the rate at which the data is being sent. The predominant methods for traffic shaping include a leaky bucket method and a token bucket method. The leaky bucket is typically used to control the rate at which data is sent into the network and provides a mechanism by which bursty data can be shaped into a steady data stream. The leaky bucket implementation is typically employed for shaping traffic into flows with a fixed rate of admission into the network and is generally ineffective in providing a mechanism for shaping traffic into flows with variable rates of admission.

The token bucket provides a method for traffic shaping and ingress rate control. The token bucket provides a control mechanism that dictates when data can be transmitted based on the presence of tokens in a bucket and uses network resources by allowing flows to burst up to configurable burst threshold levels. In the token bucket implementation, tokens are "put" into the bucket at a certain rate, and the bucket has a predetermined capacity. In such an implementation, if the bucket fills up to its top capacity, newly arriving tokens are discarded. Similarly, if the bucket is full of tokens, incoming tokens overflow and are not available for future packets. Thus, at any time, the largest burst of data a source can send into a network is roughly proportional to the size of the bucket. In the token burst implementation, a system administrator may configure a token generation rate and a depth of the burst.

In addition to traffic shaping, the token bucket methods may be employed for congestion avoidance. As is known in the art, congestion avoidance refers to methods of controlling an average queue size on an outgoing interface of a router such as an edge router. The primary mechanism used by the token bucket and leaky bucket for shaping the traffic includes dropping the incoming data packets to the network. Some routers handle dropping the packets using a technique typically referred to as tail dropping. Using tail dropping, a router simply drops packets indiscriminately, i.e., without regard to priority or class of service, for example. Other methods that have been used to avoid congestion more effectively than tail dropping include a Random Early Detection ("RED"), a Flow-based Random Early Detection ("FRED"), or a Weighted Random Early Detection ("WRED").

When RED is not configured, output buffers fill during periods of congestion. When the buffers are full, tail drop occurs, and all additional packets are dropped. Since the packets are dropped all at once, global synchronization of Transmission Control Protocol hosts can occur as multiple hosts reduce their transmission rates. As the congestion clears, the Transmission Control Protocol sources increase their data transmission rates, resulting in waves of congestion followed by periods where the transmission link is not fully used.

The Random Early Detection mechanism controls the data congestion by dropping or marking packets with a drop probability. Typically, an algorithm used by the Random Early Detection mechanism may sample a queue length on a router and compare it to two threshold levels, a low threshold level and a high threshold level. For example, if the queue length is less than the low threshold level, no packets are dropped and packets are forwarded to a destination address. If the queue length is between the low threshold level and the high threshold level, incoming packets are dropped with a probability that is directly proportional to the queue length, and, if the queue length is greater than the high threshold level, all incoming packets are dropped.

The Random Early Detection mechanism reduces the chances of tail dropping by selectively dropping packets when, for example, an output interface begins to show signs of congestion. By dropping some packets early rather than waiting until the buffer is full, Random Early Detection avoids dropping large numbers of packets at once and minimizes the chances of global synchronization.

The Weighted Random Early Detection generally drops packets selectively based on IP precedence so that packets with a higher IP precedence are less likely to be dropped than packets with a lower precedence. In such an implementation, higher priority traffic is delivered with a higher probability than lower priority traffic. The Weighted Random Early Detection is more useful in the core routers of a network, rather than at the edge routers that assign IP precedence to packets as they enter the network.

While the Random Early Detection mechanism and the variation thereof have been widely studied and employed in the existing computer networks, they suffer from a number of disadvantages. The Random Early Detection mechanism as well as the Weighted Random Early Detection mechanism signal the source about the congestion by dropping the packets and have the ability to control only a predetermined type of data, specifically, Transmission Control Protocol data.

Thus, the need remains for a system and method for traffic shaping in computer networks.

SUMMARY OF THE INVENTION

In accordance with embodiments of the present invention, some of the problems associated with traffic shaping are overcome.

An embodiment of a method for traffic shaping in a computer network, according to the present invention, involves receiving at least one data packet on a traffic manager from a user network entity and, responsive thereto, calculating at least one flow control parameter using the at least one data packet from the user network entity. Next, the at least one flow control parameter is compared to at least three threshold levels including a committed threshold level, a control threshold level and a peak threshold level. According to one embodiment of the present invention, the traffic manager includes a traffic shaper. In such an embodiment, the method includes calculating a data packet rate on the traffic shaper. If a value of the at least one flow control parameter, i.e. a data packet rate, falls between the committed threshold level and the control threshold level, the method includes applying a link layer control mechanism to control data flow from the user network entity. The link layer control mechanism may involve controlling a transmit slot allocation for transmission from the user network entity. In a data-over-cable system, the traffic manager may employ a bandwidth allocation mechanism, such as MAP, to control upstream bandwidth allocation for the user network entity.

Another embodiment of a method for traffic shaping according to the present invention involves, receiving at least one data packet on a traffic manager including a traffic conditioner from a user network entity and, responsive thereto, calculating at least one flow control parameter such as a queue size on an outgoing interface using the at least one data packet from the user network entity. Next, the queue size is compared to at least three threshold levels including a committed threshold level, a control threshold level and a peak threshold level. If a value of the queue size falls between the committed threshold level and the control threshold level, the method includes applying a link layer control mechanism to control data flow from the user network entity. The link layer control mechanism may involve controlling a transmit slot allocation for transmission from the user network entity. In a data-over-cable system, the traffic manager may employ a bandwidth allocation mechanism, such as MAP, to control upstream bandwidth allocation for the user network entity.

Another embodiment of a method for traffic shaping in a data-over-cable system involves, receiving at least one data packet on a traffic manager from a cable modem via an upstream communication link and, responsive thereto, calculating at least one flow control parameter, such as a packet arrival rate or a queue size on an outgoing interface. Next, the method involves comparing a value of the at least one flow control parameter to at least three flow control threshold levels including a committed threshold level, a control threshold level and a peak threshold level. If the value of the at least one flow control parameter falls between the committed threshold level and the control threshold level, the method involves controlling a bandwidth allocation for upstream transmission from the cable modem.

An embodiment of a computer system, according to the present invention, includes an input interface arranged to receive at least one data packet from a network entity via an upstream communication link, an output interface arranged to send the at least one data packet to an external network, and a traffic manager connected to the input interface and the output interface. The traffic manager is arranged to calculate at least one flow control parameter using the at least one data packet received from the network entity and compares it to a set of flow control thresholds including a committed threshold level, a control threshold level, and a peak threshold level. The traffic manager is further arranged to apply a flow control mechanism to control data flow from the network entity is a value of the at least one flow control parameter falls between the committed threshold level and the control threshold level.

These as well as other aspects and advantages of the present invention will become more apparent to those of ordinary skill in the art by reading the following detailed description, with reference to the accompanying drawings.

BRIEF DESCRIPTION OF THE DRAWINGS

Exemplary embodiments of the present invention are described with reference to the following drawings, in which:

FIG. 3 is a block diagram illustrating an exemplary implementation of threshold levels for traffic shaping and congestion avoidance according to an embodiment of the present invention.

DETAILED DESCRIPTION OF PREFERRED EMBODIMENTS

Figure 1:
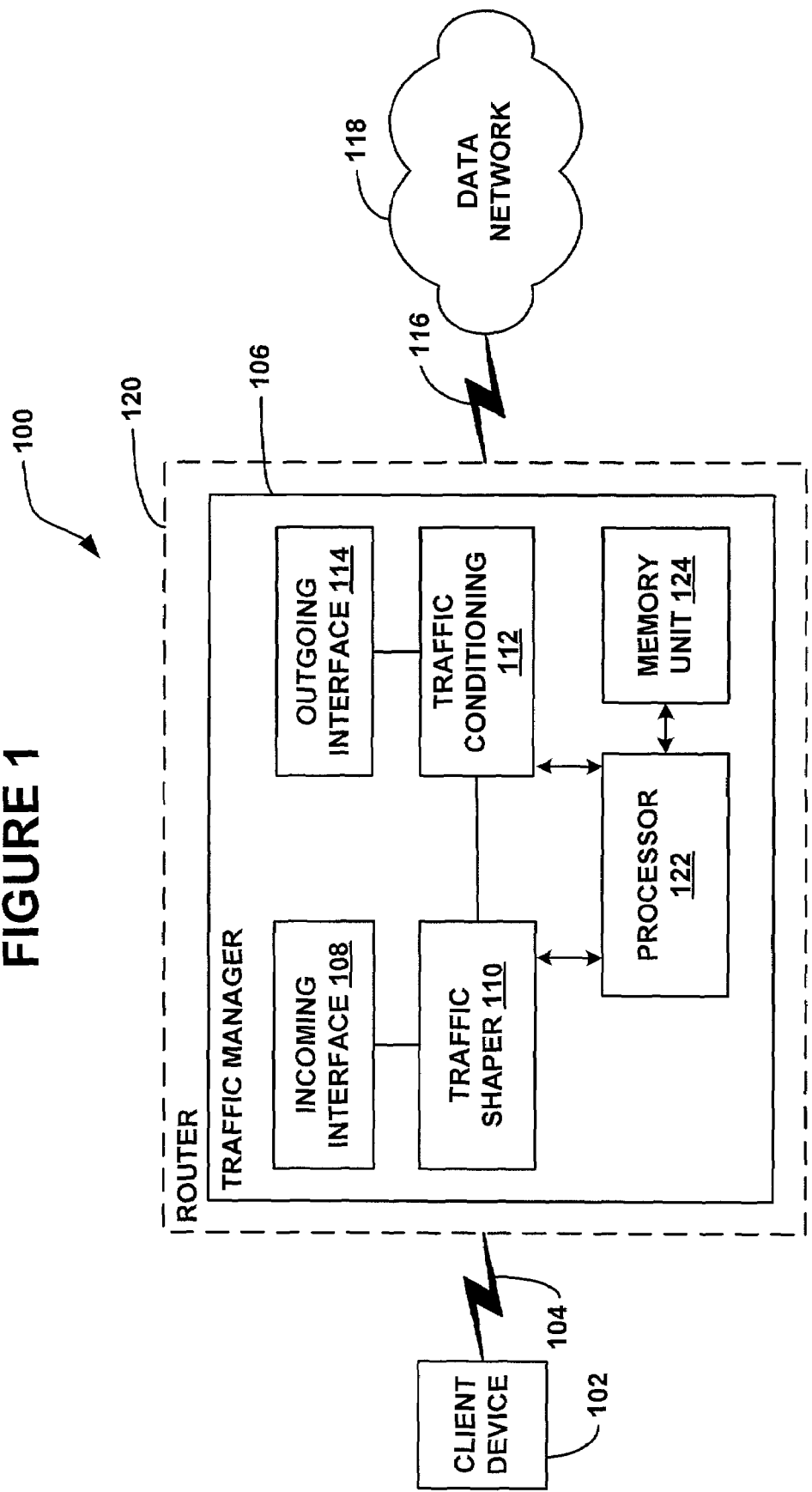
FIG. 1 is a functional block diagram illustrating a system architecture suitable for application of the present invention.

FIG. 1 is a functional block diagram illustrating an exemplary embodiment of a network architecture 100 suitable for application to the present invention for traffic shaping based on flow control and generalized congestion. FIG. 1 shows the architecture 100 including a data network 118, such as a public Internet Protocol (IP) network to which a router 120 is linked via a network connection 116. A user network entity, such as a client device 102, is linked to the router 120 via a communication link 104. The communication link 104, as will be described in greater detail below, may include a cable connection, a wireless connection, a dial-up connection, or any other network connection utilizing a network protocol including link-layer mechanisms for controlling data transmission from the client device 102.

In the network architecture 100 illustrated in FIG. 1, the router 120 may include an edge router. Edge routers typically assign IP priority to packets as the packets enter the network so that core routers on the network may use the priority parameters specified in the packets to determine how to forward the packets to the next hop on the network. The router 120 includes a traffic manager 106 for traffic shaping according to one embodiment of the present invention, in which, upon a receipt of at least one data packet from the client device 102, the traffic manager 120 calculates at least one flow control parameter and compares it to at least three threshold levels including a committed threshold level, a control threshold level and a peak threshold level. If the value of the calculated flow control parameter falls between the committed threshold level and the control threshold level, the traffic manager 120 applies a link-layer control mechanism to control data flow from the client device 102, as will be described in greater detail below.

The traffic manager 106 includes a traffic shaper 110 and a traffic conditioner 112. FIG. 1, as well as subsequent figures, illustrates an embodiment in which the traffic shaper 110 and the traffic conditioner 112 are separate entities, where the traffic shaper 110 controls data flow one an incoming interface 108, and the traffic conditioner 112 controls data flows on an outgoing interface 114. However, it should be understood that in a preferred embodiment the router 120 may include a single entity including the functionality of both the traffic shaper 110 and the traffic conditioner 112.

The traffic shaper 110 calculates a flow control parameter such as a data arrival rate on the incoming interface 108. When the traffic shaper 110 calculates the data arrival rate, it compares the data arrival rate with a predetermined set of traffic shaping thresholds. If the flow control parameter calculated on the traffic shaper 110 includes a data arrival rate, the traffic shaper 110 compares it to at least three threshold levels including a committed rate threshold level, a control rate threshold level and a peak rate threshold level. In such an embodiment, if the data arrival rate falls between the committed threshold level and the control threshold level, the traffic manager 106 enables a flow control mechanism to control the rate of data being sent from the client device 102. The traffic manager 106 controls the data sending rate of the client device 102 using link layer specific methods. The link layer specific methods that may be employed on the traffic manager 106 for slowing down transmission rate from the client device 102 may depend on a type of the communication link 104 between the client device 102 and the router 120, an embodiment of which will be described in greater detail below in reference to a data-over-cable system.

Referring back to FIG. 1, the traffic manager 106 further includes the traffic conditioner 112 coupled to the outgoing interface 114. According to an exemplary embodiment of the present invention, the traffic conditioner 112 calculates a flow control parameter, i.e., a congestion avoidance parameter such as a number of packets queued on the outgoing interface 114 as means for the congestion avoidance control. The traffic conditioner 112 may control the congestion by calculating an average queue size on the outgoing interface 114. Upon calculating the average queue size, the traffic conditioner 112 may compare it to a predetermined set of queue size thresholds. Alternatively, the traffic conditioner 112 may compute a number of packets on the outgoing interface 114 and compare the computed number to a set of packet number thresholds. In either embodiment, the traffic conditioner 112 compares the computed average queue size or the number of packets to at least three threshold levels: a committed threshold level, a control threshold level and a peak threshold level.

In such an embodiment employed on the traffic shaper 112, if the average queue size or the number of packets on the outgoing interface 114 falls between the committed threshold level and the control threshold level, the traffic manager 106 enables a link-layer flow control mechanism to lower the average queue size or the number of packets on the outgoing interface 114. Similarly to the mechanism employed for the traffic shaper 110, the link-layer flow control mechanism may depend on the type of the communication link 104 between the client device 102 and the router 120.

According to an exemplary embodiment of the present invention, the router 120 includes typical routing elements associated with conventional routers. Referring to FIG. 1, the router 106 includes a memory unit 124 and a processor 122. The memory unit 124 may include a conventional routing table, threshold levels for the traffic shaper 110 and the traffic conditioner 112, as well as a set of instructions including logic that may be retrieved by the processor 122 to calculate flow control parameters such as a packet arrival rate on the incoming interface 108 or an average queue size on the outgoing interface 114. The set of instructions may further include logic for comparing the calculated flow control parameters to a set of thresholds levels stored in the memory unit 124 and, further, for applying link layer control mechanisms for slowing data transmission from the client device 102.

In one embodiment of the present invention, the memory unit 124 may store more than one set of data rate levels for the traffic shaper 110 and more than one set of packet number or queue size threshold levels for the traffic conditioner 112. In such an embodiment, for example, different sets of packet rate threshold levels or queue size threshold levels may be used for different client devices. For example, the memory unit 124 may include a table mapping a network address, such as a MAC address, of the client device 102 to a predetermined set of thresholds. The memory unit 124 may further include a set of instructions for assigning priorities to incoming packets based on, for example, a policy associated with different types of packets, or a service policy associated with the client device 102.

FIG. 1 illustrates one exemplary architecture 100 suitable for application of the present invention, however, it should be understood that more or fewer network elements could also be used. Further, those skilled in the art will appreciate that the functional entities illustrated in FIG. 1 may be implemented as discrete components or in conjunction with other components, in any suitable combination and configuration. For example, the traffic manager 106 is not limited to including a combination of the traffic shaper 110 and the traffic conditioner 112 and, depending on the application, it could include solely the traffic shaper 110 or the traffic conditioner 112.

Figure 2:
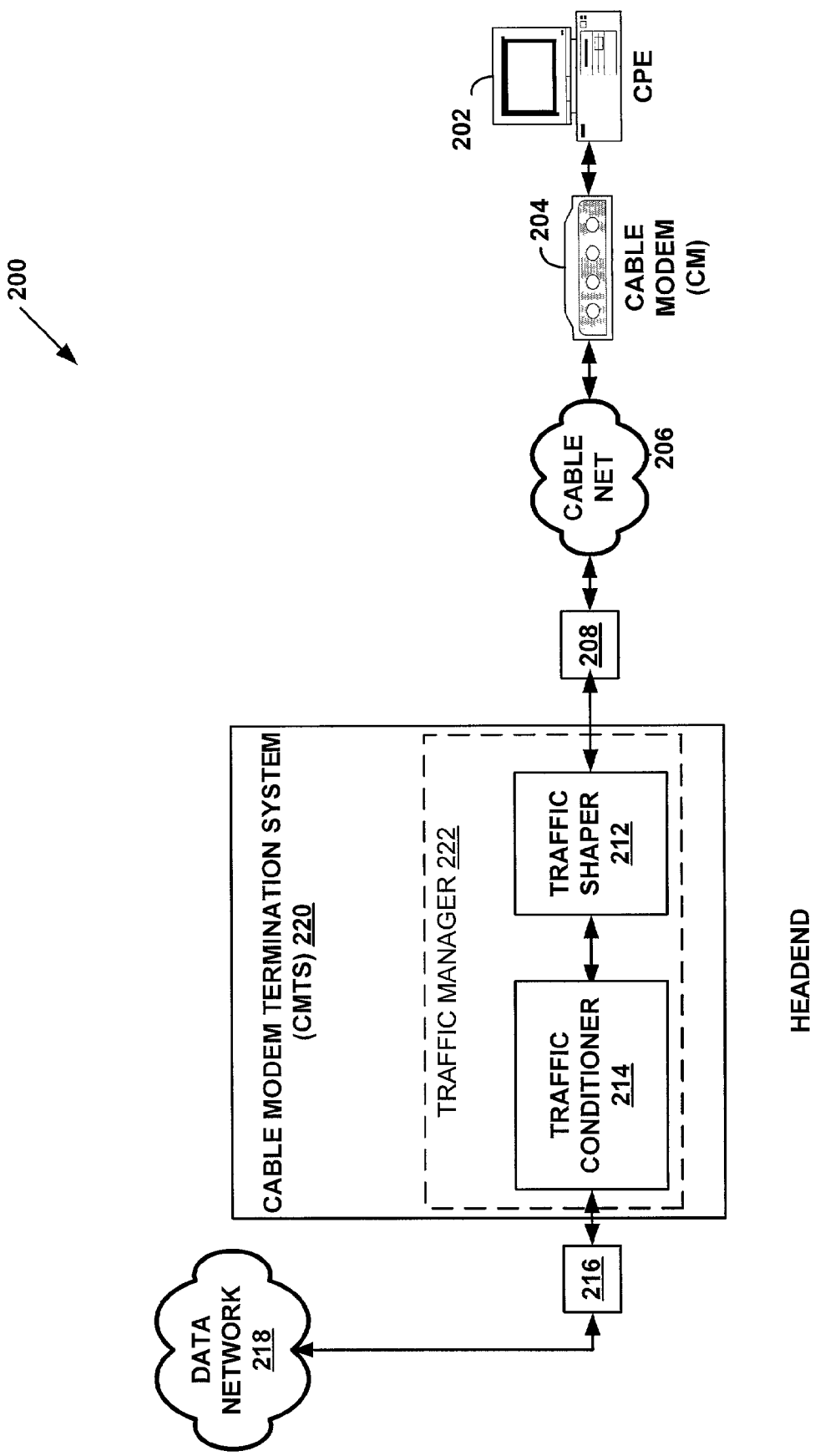
FIG. 2 is a functional block diagram illustrating a data-over-cable system for traffic shaping and congestion avoidance according to an embodiment of the present invention.

FIG. 2 illustrates a functional block diagram illustrating another exemplary embodiment of a network architecture 200 suitable for application of the present invention in a data-over-cable network environment. The system architecture 200 illustrates a bi-directional cable network 206 supporting a downstream data flow, i.e., data flow from a headend to a subscriber 202 connected to a cable modem ("CM") 204, and an upstream data flow, i.e., data flow from the subscriber 202 to the headend. The cable-television network headend is a central location responsible for sending and receiving cable signals in downstream and upstream directions. However, the illustrated architecture is not limited to the bi-directional cable network 206 and may also include a uni-directional cable network, in which an upstream connection from the subscriber 202 to the headend 210 may include a dial-up connection via a telephone network such as a Public Switched Telephone Network ("PSTN"). In such an embodiment, the CM 204 may include an integral telephone modem for connecting to a PSTN that may provide a communication link between the CM 204 and the headend. When the upstream connection from the subscriber 202 is utilized via the PSTN, the upstream communication link terminates on a Telephone Resource Access Concentrator ("TRAC") that may be located at the headend or have routing associations with network entities at the headend. However, it should be understood that the unidirectional cable systems are not limited to employing the PSTN as the upstream link, and the upstream connection may include a wireless connection, a satellite connection, or other types of connections.

The headend includes a cable modem termination system (CMTS) 220 connected to the cable television network 206 via an interface 208. FIG. 2 illustrates one CMTS; however, the data-over-cable system 200 may include a plurality of cable modem termination systems. Further, the CMTS 220 and any other network entity described herein may be duplicated in a serial or parallel arrangement to provide back-up in case of failure.

The CMTS 220 may include a Total Control hub by 3Com Corporation of Santa Clara, Calif., with a cable modem termination unit. The Total Control hub is a chassis with multiple networking cards connected by a common bus. However, the CMTS 220 may use different network servers as well. The cable network 206 may include a cable television network such as one provided by Comcast Cable Communications, Inc., Cox Communications, or Time-Warner Cable, for instance.

The CM 204 may be connected to the cable network 206 with a downstream cable connection or an upstream cable connection, depending on whether it operates in a bi-directional cable system or an uni-directional cable system. The CM 204 may be provided by 3Com Corporation of Santa Clara, Calif., for instance; however, different cable modems provided by other producers may also be used. FIG. 2 illustrates one CM 204 connected to the CMTS 220; however, typical data-over-cable systems may include tens or hundreds of CMs that may be connected to the CMTS 220. In addition, the CM 204 is connected to the subscriber entity 202 such as a customer premises equipment entity ("CPE") including a personal computer system, a VoIP device, or a telephone, for instance. The CM 204 may be connected to the CPE 202 via a cable modem-to-CPE interface ("CMCI"). FIG. 2 illustrates one CPE 202; however, the CM 204 may be coupled to multiple CPE entities.

The CMTS 220 is connected to a data network 218 such as a public IP network via a CMTS-Network System Interface ("CMTS-NSI") 216. The CMTS-NSI 216 provides an interface for data packets transmitted via the data network 218 to the CPE 202 and for packets from the CPE 202 transmitted via the CMTS 220 to a network entity on an external network.

In the data-over-cable system 200, the CMTS 220 includes a traffic manager 222 arranged to calculate at least one flow control parameter that may be used for traffic shaping and congestion control according to an embodiment of the present invention. As illustrated in FIG. 2, the traffic manager 222 includes a traffic shaper 212 and a traffic conditioner 214. The traffic shaper 212 calculates and monitors a packet arrival rate on the upstream connection via the interface 208 from the CM 204, and uses at least three threshold levels to determine a control mechanism that may be applied for traffic shaping. Similarly to the system architecture described in reference to FIG. 1, the traffic shaper 212 compares the packet data arrival rate of packets at the interface 208 to at least three threshold levels such as a committed rate threshold level, a control rate threshold level, and a peak rate threshold level. If the calculated packet arrival rate falls between the committed rate threshold level and the control rate threshold level, the traffic shaper 212 enables a flow control mechanism to signal an end user, i.e., the CM 204.

The traffic conditioner 214 is coupled to the interface 216 and computes an average queue size or a number of packets on the interface 216. Similarly to the traffic shaper 212, the traffic conditioner 214 compares the computed number to at least three threshold levels such as a committed queue size threshold level, a control queue size threshold level and a peak queue size threshold level. If the computed number falls between the committed threshold level and the control threshold level, the traffic conditioner 214 enables a link-layer mechanism to lower the queue size on the interface 216.

The traffic shaper 212 and the traffic conditioner 214 as illustrated in FIG. 2 are separate entities. However, those skilled in the art will appreciate that the traffic conditioner and shaper may be implemented on a single network entity arranged to calculate and monitor a packet arrival rate from the CM 204 and a queue size on the outgoing interface 216, and the functionality of either entity may be enabled or disabled based on the need of a particular application.

Network devices for exemplary embodiments of the present invention illustrated in FIG. 2 may interact based on standards proposed by the Data-Over-Cable-Service-Interface-Specification ("DOCSIS") standards from the Multimedia Cable Network Systems ("MCNS"), the Institute of Electrical and Electronic Engineers ("IEEE"), International Telecommunications Union-Telecommunication Standardization Sector ("ITU"), Internet Engineering Task Force ("IETF"), and/or Wireless Application Protocol ("WAP") Forum. However, network devices based on other standards may also be used. DOCSIS standards can be found on the World Wide Web at the Universal Resource Locator ("URL") "www.cablemodem.com." IEEE standards can be found at the URL "www.ieee.org." The ITU, (formerly known as the CCITT) standards can be found at the URL "www.itu.ch." IETF standards can be found at the URL "www.ietf.org." The WAP standards can be found at the URL "www.wapforum.org." However, the present invention is not limited to these standards, and any other presently existing or later developed standard may also be used. Further, the data-over-cable system 200 may be compliant with Packet Cable specifications. The Packet Cable standards may be found on the World Wide Web at the URL "www.packetcable.com."

Typically, computer networks are described using the Open System Inter-connection ("OSI") model that is a standard description or reference model for how messages may be transmitted between any two points in a communication network. The OSI model divides the process of communication between two end points into layers, where each layer is associated with a set of predetermined functional operations. Specifically, the OSI model defines seven layers including, from lowest to highest, a physical layer, a link layer, a network layer, a transport layer, a session layer, a presentation layer, and an application layer. The physical layer conveys a bit stream through the network at the electrical and mechanical level, and provides hardware means for sending and receiving data on a carrier. The data link layer provides synchronization for the physical layer and furnishes transmission protocol knowledge and management. The network layer handles routing and forwarding of data between communicating network entities. The transport layer manages the end-to-end control or error-checking, and ensures complete data transfer. The session layer sets-up, coordinates, and terminates sessions between the network entities. The presentation layer converts incoming and outgoing data from one representation format to another. Finally, the application layer identifies communicating entities, quality of service, and performs user authentication.

In the bi-directional cable system 200 illustrated in FIG. 2, the CM 204 is connected to the cable network 206 in a physical layer via a Radio Frequency ("RF") interface. In one embodiment of the present invention, for a downstream transmission, the RF interface may have a channel bandwidth of about 6 to 8 Megahertz ("MHz"), for example. The link layer includes a Medium Access Control ("MAC") layer, a Point-to-Point ("PPP") layer and an optional link security layer. The MAC layer controls the access to a transmission via the physical layer. The PPP layer encapsulates network layer datagrams over a serial communication link. The network layer includes an Internet Protocol ("IP") layer and an Internet Control Message Protocol ("ICMP") layer. The IP is a routing protocol designed to route traffic within a network or between networks. The ICMP provides a plurality of functions such as error reporting, reachability testing, congestion control, and route-change notification, for example. The transport layer includes a User Datagram Protocl ("UDP") layer that provides a connectionless mode of communication with datagrams. The transport layer may also include other types of layers, such a Transmission Control Protocol ("TCP"), for instance.

Above the transport layer, there are: a Simple Network Management Protocol ("SNMP") layer, a Trivial File Transfer Protocol ("TFTP") layer, a Dynamic Host Configuration Protocol ("DHCP"), and an UDP manager. The SNMP is used to support network management functions. The TFTP layer is a file transfer protocol that is used to download files and configuration files. The DHCP layer is a protocol for passing configuration information to hosts, and the UDP manager distinguishes and routes packets to an appropriate service. However, more, fewer, or different protocol layers could also be used.

In the DOCSIS environment, the bandwidth for a downstream channel ranges from 6 to 8 MHz and is shared between CMs receiving data from a CMTS, an upstream channel in a data-over-cable system is typically modeled as a stream of mini-slots, where a CMTS generates a time reference to identify slots and controls slot allocation for each CM in the system. In the exemplary system architecture 200 illustrated in FIG. 2, the CMTS 200 may allocate the upstream bandwidth to the CM 204 using an allocation MAP mechanism. The allocation MAP is a MAC management message transmitted by the CMTS 220 on a downstream channel of the cable network 206, and describes the application of each upstream mini-slot. The MAP may define slots as reserved, contention or ranging. A reserved time slot is a time slot that is reserved for upstream data transmission for a particular CM, such as the CM 204. A contention time slot is typically shared between a number of CMs, and a ranging time slot is used for management purposes.

The CMTS 220 may transmit one or more MAPs to the CM 204 throughout the operational stage of the CM 204. When the CM 204 receives a MAP from the CMTS 220, the CM 204 transmits data from the CPE 202 based on the time slot definitions specified in the MAP. Further, using the MAP, a receiver on the CMTS 220 has the ability to predict when data transmissions will occur from the CM 204. In order for the MAP to be properly applied in the system, it is necessary that the CM 204 and the CMTS 220 are time-synchronized. In order to do that, the CMTS 220 sends a global timing reference and a timing offset to the CM 204. The CMTS 220 creates the global timing reference by transmitting a Time Synchronization ("SYNC") MAC management message at a nominal frequency of a downstream channel between the CMTS 220 and the CM 204. The SYNC MAC message includes a timestamp identifying the time of transmission from the CMTS 220. Upon the receipt of the message, the CM 204 compares the receipt time of the message with the timestamp in the SYNC MAC and, based on the comparison, adjusts its local clock reference. During a ranging process, the CMTS 220 calculates the timing offset so that transmissions from the CM 204 are aligned to the correct mini-slot boundaries. In one embodiment of the present invention, the CMTS 220 and the CM 204 may exchange ranging request messages until the correct timing offset is set on the CM 204.

FIG. 3 is a block diagram 300 illustrating an exemplary functional implementation of threshold levels according to the present invention. The block diagram illustrates a client device 302 communicating over a communication link 304 with a traffic manager entity 306 including the functionality of a traffic shaper and a traffic conditioner for controlling data transmission from the client device 302 to a data network 326 via a communication link 328.

The traffic manager 306 employs three threshold levels including a committed threshold level 308, a control threshold level 310, and a peak threshold level 312. The threshold levels may include transmission rate threshold levels for the use on the traffic shaper, and queue size threshold levels for the use on the traffic conditioner.

FIG. 3 illustrates one set of threshold levels; however, it should be understood that threshold levels for the use on the traffic shaper and traffic controller may be different. Further, more than one set of threshold levels may be employed for the packet arrival rates, for instance. In such an embodiment, the traffic shaper may select a predetermined set of packet arrival rate threshold levels based on a source network device transmitting data packets.

FIG. 3 illustrates two axes including a packet arrival rate axis 314 and a queue size axis 316. According to an exemplary embodiment of the present invention, the traffic shaper and the traffic conditioner determine a packet arrival rate and an average queue size, respectively. Subsequently, the calculated values are compared to three threshold levels associated with the computed value. Thus, for example, when the traffic shaper computes a packet arrival rate using at least one incoming data packet, the traffic shaper compares the computed packet arrival rate with three packet rate threshold levels. If the computed packet arrival rate is below the committed threshold level 308, the functionality of the traffic shaper falls into a disable flow control region 318, and no action is taken on the traffic shaper. If the packet arrival rate is greater than the peak threshold level 312, the functionality of the traffic shaper falls into a packet drop region 324, and the traffic shaper drops the packets. Alternatively, the traffic shaper may be arranged to drop packets if the packet rate is greater than or equal to the peak threshold level. Further, if the computed packet arrival rate falls between the peak threshold level 312 and the control threshold level 310, the functionality of the traffic shaper falls into a packet drop with probability region 322. If the functionality of the traffic shaper falls into the packet drop probability region 322, the traffic shaper drops packets with a probability. In one embodiment of the present invention, the traffic shaper may determine that the packets should be dropped with probability if the computed packet arrival rate is greater than or equal to the control threshold level 310 and less than the peak threshold level 312.

The packet drop probability on the traffic shaper may be a function of the packet arrival rate, and may be determined using the following formula or any similar formula:

$$P = MaxP * Current\_Arrival\_Rate / Peak\_Arrival\_Rate;$$

In the formula, P is a drop probability, MaxP is a maximum drop probability, the Current_Arrival_Rate is a current arrival rate of packets of the incoming interface, and the Peak_Arrival_Rate is a maximum packet arrival rate. The MaxP parameter and the Peak_Arrival_rate parameter may be set by a system administrator, or, alternatively, may be pre-stored on the traffic manager 306.

Referring back to FIG. 3, when the packet arrival rate falls between the committed threshold level 308 and the control threshold level 310, the functionality of the traffic shaper falls into a flow control region 320. In one embodiment of the present invention, the traffic shaper may determine that it should employ a flow control mechanism if the calculated packet arrival rate is greater than or equal to the committed threshold level 308 and less than the control threshold level 310. When the functionality of the traffic shaper falls into the flow control region 320, the traffic shaper employs link-layer methods to slow down the packet arrival rate from the client device 302.

The operation of threshold levels illustrated in FIG. 3 has been described in reference to the traffic shaper and the packet arrival rates. However, it should be understood that the described embodiments would be equally applicable to the traffic conditioner utilizing queue size threshold levels instead of the packet arrival threshold levels.

Figure 4A:
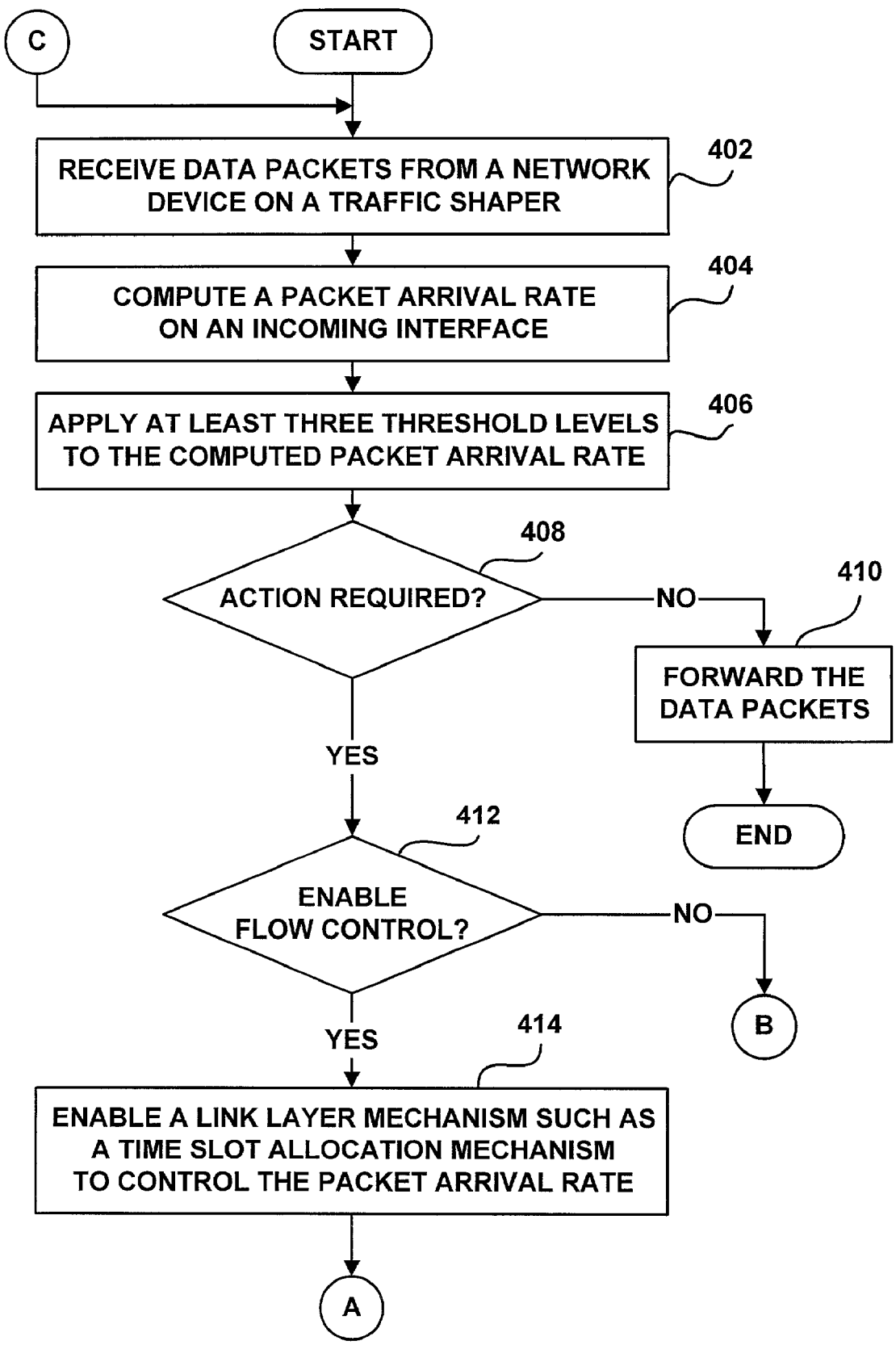
FIGS. 4A–4B are a flowchart illustrating a method for traffic shaping in a data-over-cable system according to an embodiment of the present invention.
Figure 4B:
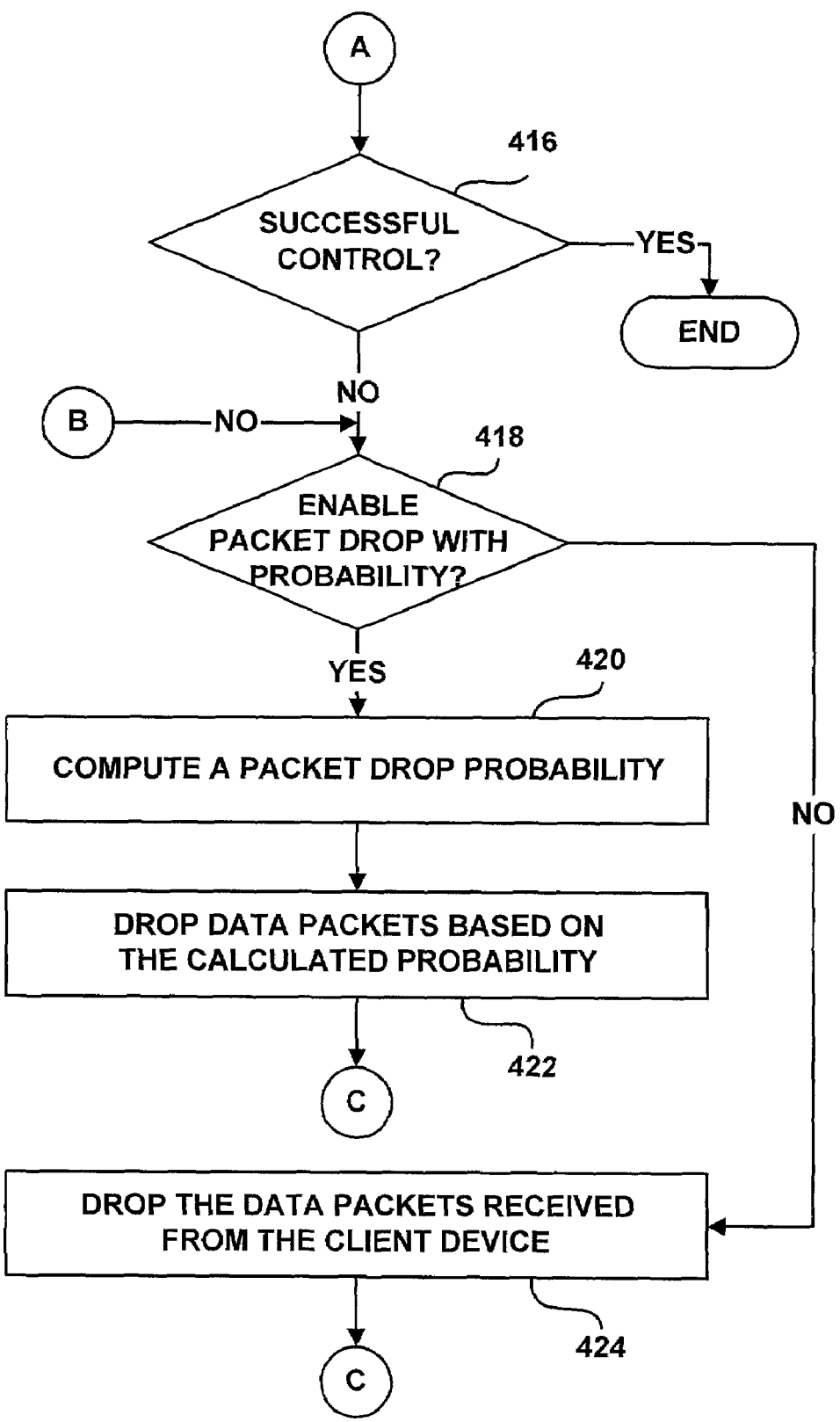

FIGS. 4A and 4B illustrate an exemplary method 400 according to the present invention for employing the threshold levels illustrated in FIG. 3 for traffic shaping in the data-over-cable system 200 of FIG. 2.

Referring to FIG. 4A, at step 402, a traffic shaper receives at least one data packet from a client device. In the embodiment illustrated in FIG. 2, the traffic shaper includes the traffic shaper 212, the client device includes the CM 204 communicating data from and to the CPE 202. Further, in the embodiment of FIG. 2, the traffic shaper 212 receives the data from the CM 204 over an upstream communication link on the cable network 206.

Upon the receipt of data packets from the client device, at step 404, the traffic shaper computes a flow control parameter such as a packet arrival rate on an incoming interface, such as the interface 208 of FIG. 2. At step 406, the traffic shaper applies at least three threshold levels to the computed packet arrival rate. In the embodiment illustrated in FIG. 3, the traffic shaper compares the computed packet arrival rate to the committed threshold level 308, the control threshold level 310, and the peak threshold level 312. At step 408, the traffic shaper determines whether any action on the incoming packets is required. If the computed packet arrival rate does not exceed the committed threshold level 308, there is no action required, and, at step 410, the CMTS 200 forwards the received data packets to the output interface 216 and the data network 218.

If the packet arrival rate is greater than the committed threshold level 308, at step 412, the traffic shaper determines whether a flow control mechanism should be enabled. To do that, the traffic shaper determines whether the computed packet arrival rate is greater than or equal to the committed threshold level 308 and is below the control threshold level 310.

If the condition at step 412 is valid, at step 414, the CMTS enables a flow control mechanism such as a link-layer mechanism to control the packet arrival rate from the client device. In the data-over-cable system, the CMTS 220 controls the sending rate from the CM 204 by delaying or not generating reserved time slots for data transmission from the CM 204. For example, when the CMTS 220 generates the next MAP for the CM 204, the generated MAP may not include any reserved time slots defining exclusive time intervals for upstream transmission from the CM 204. In such an embodiment, the CMTS 220 may allocate the time intervals that were not allocated to the CM 204 to another CM in the system.

Referring to FIG. 4B, at step 416, the traffic shaper determines whether the client device has responded to the control mechanism. In a data-over-cable system, a CM uses reserved time slots for upstream transmission, however, if none of those are available, the CM may employ contention slots that are shared between all CMs utilizing the upstream channel. Thus, if the contention slots specified in the MAP are not employed by other CMs, the CM 204 may employ the available contention slots for the upstream transmission. Thus, to determine whether the control mechanism is successful, the traffic shaper may recalculate a packet arrival rate from the CM 204 and determine whether the computed rate decreased below the committed threshold level 308. If the packet data rate has decreased below the derived level, the method 400 terminates.

If the CM 204 fails to respond, at step 418, the traffic shaper determines whether a packet drop with probability should be enabled to slow down the packet arrival rate from the client device. To do that, the traffic shaper may use the recalculated packet arrival rate. If the recalculated packet arrival rate is greater than or equal to the control threshold level 310 and falls below the peak threshold level 312, at step 420, the traffic shaper computes a probability for dropping the incoming data packets from the CM 204. In one embodiment of the present invention the probability for dropping the packets may be calculated using the following equation:

$$P = MaxP * Current\_Arrival\_Rate / Peak\_Arrival\_Rate;$$ where P is a drop probability, MaxP is a maximum drop probability set by a system administrator or prestored on the traffic shaper 212, Current_Arrival_Rate is an arrival rate of packets measured on the incoming interface, and Peak_Arrival_Rate is a maximum packet arrival rate set by a system administrator or prestored on the traffic shaper 212.

When the traffic shaper computes the packet drop probability, at step 422, the packet shaper starts dropping the incoming packets based on the calculated drop probability, and the method 400 may continue at step 402 in FIG. 4A, where the traffic shaper continues monitoring the packet arrival rate from the CM 204.

Referring back to step 418, if the traffic shaper determines that the packet arrival rate is greater than or equal to the peak rate threshold level 312, the traffic shaper, at step 424, drops the data packets received from the CM 204, and the method 400 may continue at step 402, where the traffic shaper applies the method 400 to the next incoming packet.

The method 400 has been described in reference to the data-over-cable network 200 and the traffic shaper 212 on the CMTS 220. However, it should be understood that the analogous method could be applied on the traffic conditioner 214 arranged to monitor an average queue size on the output interface 216, and further to compare the average queue size to three threshold levels including a committed queue size threshold level, a control queue size threshold level, and a peak queue size threshold level. Further, based on the comparison, the traffic conditioner 214 may take an appropriate action, as described in reference to FIG. 3. Thus, the traffic conditioner 214 may either forward the data packets to the public IP network 218, enable a flow control, drop packets with a predetermined probability or drop all incoming packets. If the average queue size is between the controlled queue size threshold level and the committed queue size threshold level and the method is applied in a data-over-cable system, the traffic conditioner 214 may decrease the number of contention slots momentarily for a data transmitting CM, or may identify the CM and then momentarily decrease the number of reserved slots for that CM.

It should be understood that the exemplary embodiments of the present invention are not limited to the data-over-cable systems and could be applied in other types of networks employing data link layers below the IP layer. Further, instead of employing the link-layer mechanisms on the traffic manager 106 or 122, the traffic managers may employ an Explicit Congestion Notification ("ECN") mechanism when a packet data rate or a queue size fall into the flow control region 320. The ECN mechanism provides a congestion indication mechanism, and a sender entity is notified of the congestion through a packet marking mechanism. To employ the ECN, an IP header of packets sent from the sender entity includes an ECN field having two or more bits. In such an embodiment, the sender entity may set an ECN-capable transport ("ECT") bit to indicate that the end points are ECN capable. If the traffic managers according to the exemplary embodiments detect that a packet data rate or queue size falls into the flow control region 320, the traffic manager may set a congestion experienced ("CE") bit to indicate congestion to the end nodes. When a receiving entity receives a data packet with a CE bit set, the receiving entity sends a congestion indication to the sending entity using, for example, an acknowledgement ("ACK") message having a CE bit set. When the sending entity receives a CE packet, the sending entity may reduce its congestion window. More information on the ECN mechanism may be found in a Request For Comments ("RFC") 2481, "A Protocol To Hold Explicit Congestion Notification (ECN) to IP", herein incorporated by reference and available from the Internet Engineering Task Force (IETF) at www.ietf.org.

Further, the embodiments of the present invention could be applied on a remote access server ("RAS") providing an Internet access to user network entities via dial-up connections. In such an embodiment, a traffic shaper and a traffic conditioner may be implemented on the RAS that may enable software flow control mechanisms to control data flow from the user network entities. Further, the embodiments of the present invention may be employed in Asynchronous Transfer Mode ("ATM") networks and Frame-Relay networks. In an ATM network, Explicit Forward Congestion Indication ("EFCI") bits may be employed to indicate a congestion state on a network entity, and in a Frame-Relay network Forward Explicit Congestion Notification ("FECN") bits may be employed to notify a network entity that, for example, a network router is experiencing congestion. For more information on ATM, see "B-ISDN ATM Adaptation Layer specification," ITU-I.363.3-1996, and "Functional characteristics of ATM equipment, ITU-I.732-1996, and "Functional Architecture of transport networks based on ATM," ITU-I.326-1995, incorporated herein by reference. Further, more information on the FECN mechanism may be found in the "ATM User Network Interface Specification V3.1," incorporated herein be reference and available from the ATM Forum and available at http://www.atmforum.com.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system for traffic shaping and congestion control may be embodied in a computer program product that includes a computer usable medium. For example, such as, a computer usable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method for traffic shaping in a computer network, the method comprising:

receiving at least one data packet on a traffic manager from a user network entity;

calculating at least one flow control parameter using the at least one data packet received from the user network entity;

comparing the at least one flow control parameter to at least three threshold levels comprising at least a committed threshold level, a control threshold level and a peak threshold level; and applying a link layer control mechanism to control data flow from the user network entity if a value of the at least one flow control parameter is between the committed threshold level and the control threshold level.

2. A computer readable medium having stored therein instructions to execute the method of claim 1.

3. The method of claim 1, further comprising the steps of:
applying a data drop algorithm to the at least one data packet if the value of the at least one flow control parameter is between the control threshold level and the peak threshold level; and
dropping the at least one data packet if the value of the at least one flow control parameter exceeds the peak threshold level.

4. The method of claim 3, further comprising the steps of:
calculating a packet drop probability using the data drop algorithm and the value of the at least one flow control parameters; and
dropping the at least one data packet based on the packet drop probability.

5. The method of claim 1, wherein the step of computing the at least one flow control parameter comprises computing a data packet rate on a traffic shaper entity receiving the at least one data packet via an input interface connected to the user network entity via a communication link.

6. The method of claim 1, further comprising the step of storing a plurality of user profile records on the traffic manager, wherein each user profile record comprises at least three user-specific threshold levels.

7. The level of claim 1, wherein the step of applying a link layer mechanism to control data flow from the user network entity comprises controlling a transmit slot allocation for data transmission from the user network entity on the traffic manager.

8. The method of claim 1, wherein the computer network comprises a data-over-cable network, the traffic manager is at a cable network headend, and the user network entity comprises a cable modem transmitting the at least one data packet from a customer premises equipment entity.

9. The method of claim 1, further comprising the step of employing an Explicit Congestion Notification (ECN) mechanism if the at least one flow control parameter is between the committed threshold level and the control threshold level.

10. A method for congestion avoidance in a computer network, the method comprising:
receiving at least one data packet on a traffic manager from a user network entity;
calculating at least one congestion avoidance control parameter using the at least one data packet received from the user network entity;
comparing the at least one congestion avoidance control parameter to at least three threshold levels comprising at least a committed threshold level, a control threshold level, and a peak threshold level;
applying a link layer mechanism to control data flow from the user network entity if a value of the at least one congestion avoidance control parameter is between the committed threshold level and the control threshold level.

11. A computer readable medium having stored therein instructions to execute the method of claim 10.

12. The method of claim 10, further comprising the steps of:
applying a data drop algorithm to the at least one data packet if the value of the at least one congestion avoidance parameter is between the control threshold level and the peak threshold level; and
dropping the at least one data packet if the value of the at least one congestion avoidance control parameter exceeds the peak threshold level.

13. The method of claim 12, further comprising the steps of:
calculating a packet drop probability using the data drop algorithm and the value of the at least one congestion avoidance parameter; and
dropping the at least one data packet based on the packet drop probability.

14. The method of claim 10, wherein the step of computing the at least one congestion avoidance parameter comprises computing an average queue size on an output interface prior to forwarding the at least one data packet to an external network.

15. A method for traffic shaping in a data-over-cable system, the method comprising:
receiving at least one data packet on a traffic manager from a cable modem associated with a predetermined customer premises equipment sending the at least one data packet;
calculating at least one flow control parameter using the at least one data packet received from the cable modem;
comparing the at least one flow control parameter to at least three flow control threshold levels comprising at least a committed threshold level, a control threshold level and a peak threshold level;
controlling a bandwidth allocation for upstream transmission from the cable modem if a value of the at least one flow control parameter is between the committed threshold level and the control threshold level.

16. A computer readable medium having stored therein instructions to execute the method of claim 15.

17. The method of claim 15, wherein the traffic manager comprises a traffic shaper connected to an input interface of a headend network entity receiving the at least one data packet on an upstream connection from the cable modem, the traffic shaper calculating the at least one flow control parameter comprising a packet arrival rate on the input interface and comparing the packet arrival rate to at least three packet arrival rate threshold levels.

18. The method of claim 15, wherein the traffic manager comprises a traffic conditioner connected to an output interface of a headend network entity, the traffic conditioner calculating the at least one flow control parameter comprising an average queue size of the output interface and comprising the queue size to at least three queue size threshold levels.

19. The method of claim 15, wherein the traffic manager comprises a traffic shaper connected to an input interface of a cable modem termination system, and a traffic conditioner connected to an output interface of the cable modem termination system, the traffic shaper calculating a packet arrival rate and the traffic conditioner calculating a queue size on the output interface.

20. The method of claim 15, wherein the step of controlling a bandwidth allocation for upstream transmission from the cable modem further comprises the step of using a bandwidth allocation MAP.

21. The method of claim 20, wherein the step of using the bandwidth allocation MAP further comprises the step of not reserving bandwidth for upstream transmission from the cable modem.

22. The method of claim 21, further comprising the step of allocating the bandwidth not allocated for the cable modem to a second cable modem.

23. The method of claim 15, further comprising the steps of:
- applying a data drop algorithm to calculate a packet drop probability if the at least one flow control parameter value is between the control threshold level and the committed threshold level; and
- dropping the at least one data packet received from the cable modem based on the calculated packet drop probability.

24. The method of claim 15, further including the steps of dropping the at least one data packet received from the cable modem if the at least one flow control parameter value exceeds the peak threshold level.

25. A system for traffic shaping in a computer network, the system comprising:
- an input interface arranged to receive at least one data packet from a network entity via an upstream communication link;
- an output interface arranged to send the at least one data packet to an outside network;
- a traffic manager connected to the input interface and the output interface, the traffic manager arranged to calculate at least one flow control parameter using the at least one data packet received from the network entity and compare the flow control parameter to a set of flow control threshold levels comprising a committed threshold level, a control threshold level and a peak threshold level, the traffic manager further arranged to apply a flow control mechanism to control data flow from the network entity if a value of the at least one flow control parameter falls between the committed threshold level and the control threshold level.

26. The system of claim 25, wherein the traffic manager is connected to the input interface on a cable modem termination system.

27. The system of claim 25, wherein the traffic manager comprises a traffic shaper connected to the input interface, the traffic shaper arranged to calculate the at least one flow control parameter comprising a packet arrival rate on the input interface and compare the packet arrival rate to the set of flow control threshold levels comprising a committed packet rate threshold level, a control packet rate threshold level and a peak packet rate threshold level.

28. The system of claim 27, wherein the traffic manager further comprises a traffic conditioner connected to the output interface, the traffic conditioner arranged to calculate the at least one flow control parameters comprising an average queue size on the output interface and compare the calculated queue size to the set of flow control threshold levels comprising a committed queue size threshold level, a control queue size threshold level and a peak queue size threshold level.

29. The system of claim 25, wherein the flow control mechanism comprises a link-layer control mechanism.

30. The system of claim 29, wherein the link-layer control mechanism comprises a bandwidth allocation mechanism for controlling upstream transmission from the network entity via the upstream communication link.

31. The system of claim 30, wherein the bandwidth allocation mechanism comprises a bandwidth allocation MAP generated for the network entity.

32. The system of claim 25, wherein the traffic manager determines a packet drop probability if a value of the at least one flow control parameter falls between the control threshold level and the peak threshold level, and drops the at least one data packet based on the calculated drop probability.

33. The system of claim 25, wherein the traffic manager drops the at least one data packet if a value of the at least one flow control parameter is greater than the peak threshold level.

34. The system of claim 25, wherein the flow control mechanism comprises an Explicit Congestion Notification (ECN) mechanism.

35. The system of claim 25, wherein the flow control mechanism comprises an Explicit Congestion Indication mechanism or a Forward Explicit Congestion Notification mechanism.

* * * * *